May 11, 1926.
P. M. TRAVIS
1,583,942
CARD HOLDER FOR AUTOMOBILES
Filed June 16, 1925
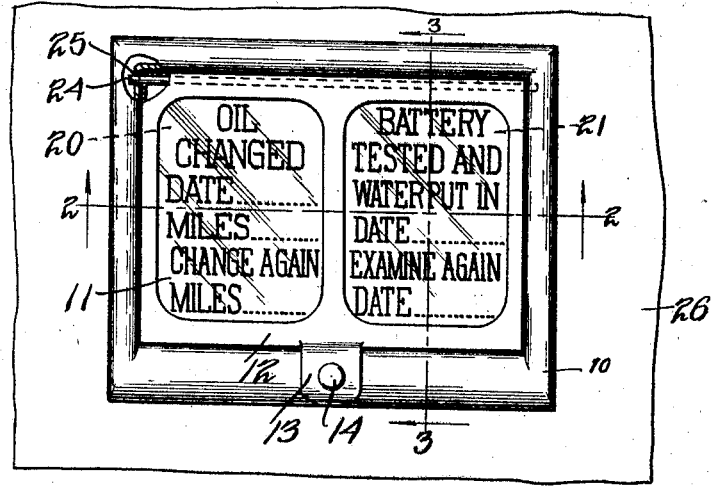
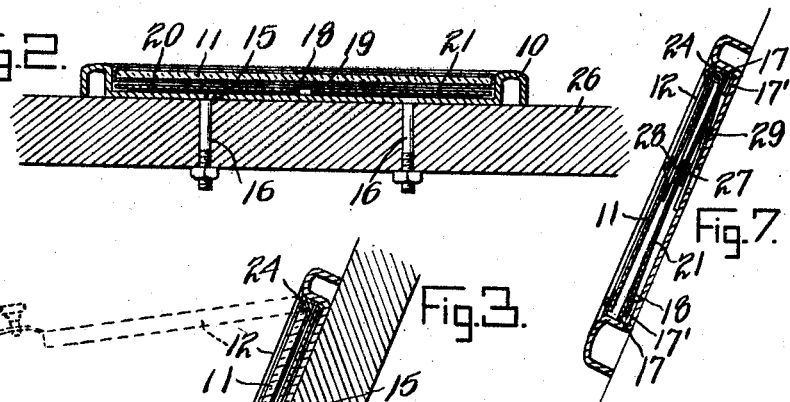
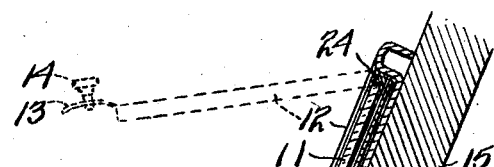
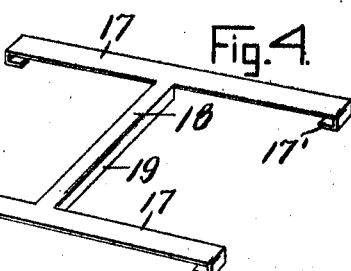
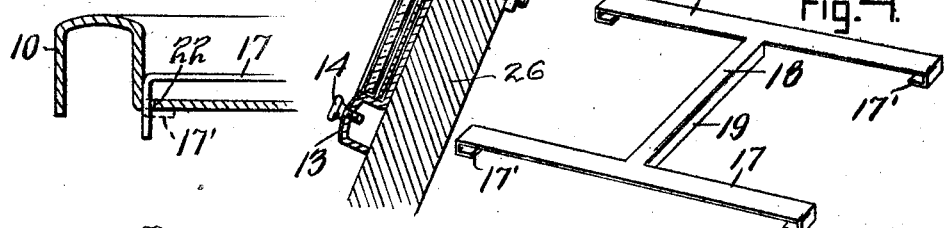
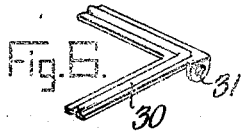
Inventor
Porter M. Travis
Attorney Patented May 11, 1926.

1,583,942

UNITED STATES PATENT OFFICE.

PORTER M. TRAVIS, OF SHERMAN, TEXAS.

CARD HOLDER FOR AUTOMOBILES.

Application filed June 16, 1925. Serial No. 37,449.

My said invention relates to a card or other article holder or container adapted to receive data relative to the operation of an automobile, said data being desirable in keeping an accurate record and in order to obtain information enabling the best service to be obtained from the vehicle.

It is an object of the invention to provide a case or container which may be made the standard equipment adapted to be mounted on the instrument board of an automobile and having indicia relative to the desired record to be kept, visible at all times, readily accessible and yet protected from the elements.

Referring to the accompanying drawings which are made a part hereof and on which similar reference characters indicate similar parts, Figure 1 is a front elevation of my invention as applied to the instrument board of an automobile, Figure 2, a section on line 2—2 of Figure 1, Figure 3, a section on line 3—3 of Figure 1, Figure 4, a perspective of a card-holding frame, Figure 5, a detail on an enlarged scale, Figure 6, a detail of another form of cover for the container showing a different hinge, and Figure 7, a section of a container having a lid like that illustrated in Figure 6 and provided with a spring for holding the lid closed.

As shown in the drawings the invention comprises a case or container formed of a body 10 having a glass or other transparent covering 11 mounted in a suitable frame 12 pivoted at one side to the body 10 and having an integral lip or securing portion 13 provided with a fastening device, as for example, a set screw 14. The body 10 is preferably formed of sheet metal and is stamped with a depressed central portion and a rim portion surrounding the same, said body being also provided with openings 15 in the bottom thereof for the reception of bolts 16 adapted to secure the same to the instrument board 26 of an automobile. Mounted in the body 10 is a frame comprising parallel arms 17 having an intermediate connecting element 18, said frame being also stamped from sheet metal and having its ends turned under and provided with portions 17' to space the frame from the bottom of the body 10 to provide a housing for cards 20 and 21. The sides of the connecting element 18 are turned downwardly at 19, serving to maintain the cards separated. However, the portions 19 may be omitted and a single centrally perforated sheet may be used, thus reducing the cost of manufacture.

As shown in Figs. 1 to 5, the device is intended to be used only with a pair of cards, one bearing indicia relative to the attention given the crankcase and the other bearing indicia relative to the attention given the battery, both being desirable in order to keep an accurate account of the operation of the car, its mileage, etc. If desired the frame might be provided with a pair of connecting elements thus three or more cards might be accommodated. The frame may be secured in the holder in any desired manner such as for example by soldering the inturned ends 17' to the body or by forming tongues on the inturned ends and extending said tongues through slits 22 in the bottom of the body and bending over the tongues on the back of the same as shown in Fig. 5. For the purpose of illustration I have shown a card 20 bearing indicia relative to the date that the oil was changed and the registered mileage for the speedometer and other additional indicia stating the desired mileage to be indicated when the oil should be again renewed. I have also provided a second card 21 bearing indicia relative to the date when the battery was tested and water was added and also indicia relative to the date when it will be desirable or necessary to again examine the battery.

The data on the cards may be supplied by the operator of the vehicle or the owner thereof and an accurate check may thereby be maintained and the vehicle better cared for as well as the determination of the durability of the various units upon which check is kept. In order to provide a more ornamental structure and to protect the data from the elements, I provide a transparent cover which is preferably mounted in a frame hinged to the body of the holder. As shown the cover frame is formed of stamped sheet metal, the sides and ends of the metal being turned over and back upon itself to form a housing for the glass or other transparent medium, the metal at one side of the cover frame being turned around a wire or pintle 24 which projects from beneath the same at both ends which ends are adapted to project through openings 25 in the sides of the body 10, the opposite side of said cover frame having an extension or finger portion 13 in which a fastening device such as a set screw 14 is mounted for engagement with the rim of the body 10. In applying the lid to the body the pintle may be removed and the lid placed in position in the body 10 so that the ends of the housing for the pintle are in alinement with the openings in the body whereupon the pintle may be passed through the openings on the underside of the rim of the body and through the alined parts.

If desired the body may be stamped with upstanding lips to hold the cards in place and all of this may be accomplished at one operation which will consequently reduce the cost of manufacture of the article, also if desired the frame may be made in an oval shape or in any other desired forms. In order to give the case a distinctive appearance and to render the same more ornamental, I preferably nickel-plate the device, however, the same may be given any desired finish.

If desired the bottom of the container or case may be provided with a pair of spaced parallel slits and the metal therebetween struck up forming a clip 27 and the lid provided with an extension or lip 28, each serving as securing means for one leg of a reversible spring 29. As shown in Fig. 7 the wire or pintle 24 of the hinge is inserted through the coil of the spring 29 maintaining it in position and the upper and lower legs tend to move toward each other thus maintaining the lid tightly closed. In manufacturing it has been found desirable to use this form of construction as the same can be produced at a greatly reduced cost.

It has likewise been found advisable to provide a lid or cover consisting of a frame 30 as shown in Fig. 6 adapted to clamp down over the record sheet and the transparent cover therefor and instead of having the housing formed at one side for the pintle or wire 24 the frame 30 may be provided with oppositely disposed perforated ears or lugs 31 adapted to be turned down at right angles and through which said pintle or wire 24 may pass.

The frame 30 is preferably provided with a longitudinally extending bead and the upper end of the spring 29 is secured within this bead by means of the extension 28 bent rearwardly across the same. The frame may or may not have its edges turned down or otherwise formed to hold the transparent cover. However, I preferably form the same as shown in Fig. 6.

It will be obvious that my device may be modified in various ways without departing from the spirit of the invention and therefore I do not limit myself to what is shown in the drawings and described in the specification, but only as indicated in the appended claims.

Having thus fully described my said invention, what I claim as new and desire to secure by Letters Patent, is:

1. A card holder for automobiles comprising a casing having a depression in the face, a cover for said depression comprising a frame having its edges turned over to form a housing for a cover glass, and a pintle disposed lengthwise within one of said turned over edges and extending through openings in the casing and forming a hinge for said cover, substantially as set forth.

2. A card holder for automobiles comprising a casing having a depression in its face, a cover for said depression comprising a frame having its edges turned over to form a housing for a cover glass, a frame for holding cards in position in said casing comprising arms having inturned ends forming retaining elements for the cards said arms being provided with a centrally disposed connecting element adapted to maintain the cards separated, and a pintle disposed lengthwise of one of said turned over edges and extending through openings in the casing and forming a hinge for said cover, substantially as set forth.

3. As an article of manufacture, a container comprising a stamped sheet metal body having an elevated rim and a depressed central portion, a cover for said depressed central portion fitting within said rim said cover comprising a sheet metal frame having its edges bent upon itself to form a housing for a cover glass, a hinge rod extending through said housing at one edge thereof and other openings in the depressed portion of the body, and means within said depressed portion to hold a card.

In witness whereof, I have hereunto set my hand and seal at Sherman, Texas, this 3d day of June, A. D. nineteen hundred and twenty-five.

PORTER M. TRAVIS. [L. S.]